(No Model.)
W. LEWIS.
COUPLING SHAFTING.
No. 419,589. Patented Jan. 14, 1890.
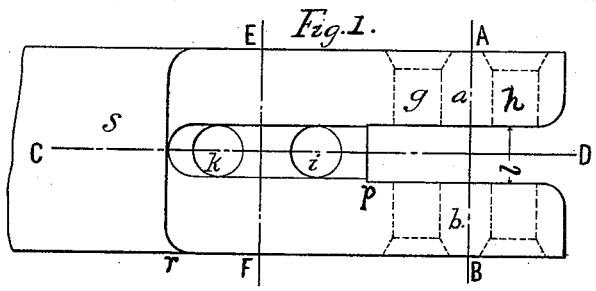
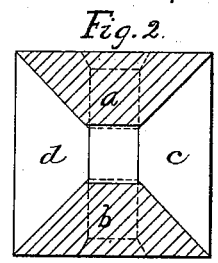
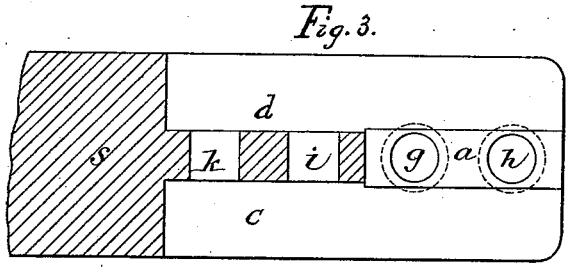
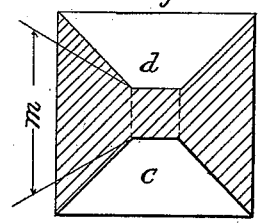
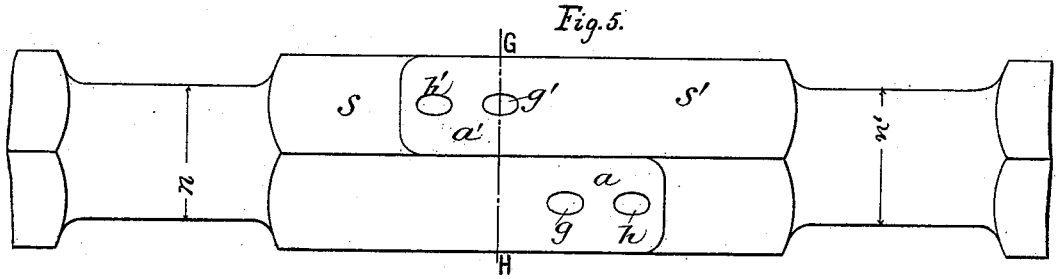
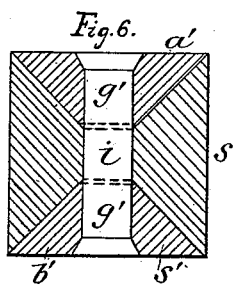
WITNESSES:
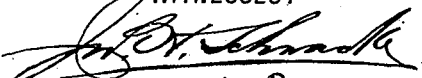
INVENTOR
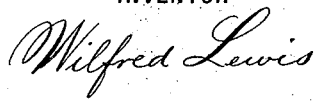

UNITED STATES PATENT OFFICE.

WILFRED LEWIS, OF PHILADELPHIA, PENNSYLVANIA, ASSIGNOR TO THE WILLIAM SELLERS & COMPANY, INCORPORATED, OF SAME PLACE.

COUPLING SHAFTING.

SPECIFICATION forming part of Letters Patent No. 419,589, dated January 14, 1890.

Application filed August 29, 1889. Serial No. 322,380. (No model.)

*To all whom it may concern:*

Be it known that I, WILFRED LEWIS, of the city and county of Philadelphia, and State of Pennsylvania, have invented a new and useful Improvement in Coupling Shafting, of which the following is a specification.

My invention relates particularly to the union of square driving-shafts over which a sleeve may have to pass; but it can be applied to round shafting as well. In either case the section of the coupling cannot exceed that of the shaft, and hitherto the means devised for the purpose have been so defective that a welded joint has been generally preferred. The welded joint, when properly made on wrought-iron shafts, is undoubtedly superior to any other in strength and stiffness; but obviously it is not a convenient joint to put together or take apart in many locations where such joints are required. On steel shafts, however, which are becoming more generally used than iron, it is difficult to make a perfect weld, and as many grades of steel are seriously injured by unequal heating the welded joint in such cases loses in great measure the advantages mentioned, and the need of a good mechanical union is more urgently felt. For this purpose a common form of mechanical union is made by scarfing the ends of the shafts to be united and riveting them together. In this joint the whole strain of transmission is thrown upon the rivets, and in addition to this there is always more or less bending strain tending to work them loose. The strength of the joint is thus limited by that of the rivets, and these cannot be very large without excessive weakening of the shaft through which they pass. An improvement upon this form of coupling has been made by using a double scarf, so that the rivets drive by double shear with their heads holding in opposite sides of the same piece. In this case a part of the driving strain is carried directly by the interlocking ends of the shafts, relieving the rivets and adding greatly to the strength of the joint; but torsional strain is not the only load which a joint of this kind is required to carry, and it frequently happens that the transverse strain is much more severe. This may easily arise from imperfect alignment or a slight bend in the shaft near the joint. In either case the shaft in revolving tends to shear the rivets alternately in opposite directions, causing them finally to work loose and displace the united ends. A remedy for this defect might be looked for in a certain loose joint where the ends of the shafts are simply notched together and the notches held in place by a pin in the axis of the shafts, with cross-pins passing through it near the end of each shaft. The driving strain is here carried directly by the notches and the flexible nature of the joint allows it to yield to slight defects in alignment without overstraining the pin-connections; but it is found in practice that however little out of perfect alignment the shaft may be the constant rubbing of their notched ends together while running soon wears them away, so that the shafts thus joined no longer stand in their true relation to each other. If the notches are made deeper to increase their wearing-surface, the joint becomes weaker in consequence and the need of a stronger and more durable coupling for driving-shafts with sliding sleeves is evident.

It is therefore an object of my present invention to unite mechanically the ends of the two shafts in a stronger and more durable manner than has hitherto been accomplished.

It is a further object of my invention to unite mechanically the ends of two shafts, so that transverse as well as torsional strain can be carried without injuring the joint and without inducing alternate and opposite strains in the fastening while running.

It is a further object of my invention to combine great strength and stiffness in a shaft-coupling with flexibility on either side of the coupling, and thereby reduce, as desired, the effect on the coupling of imperfect alignment in the shaft.

To these ends my invention consists in the combination of two shafts, each having two equal and opposite grooves and tongues at their ends which interlock to form a coupling.

It further consists in the combination of two shafts, each having equal and opposite grooves and tongues at their ends, interlocked and united by a bolt or rivet through the tongues on one shaft and the web between the grooves on the other shaft.

It further consists in the combination of a rigid shaft-coupling with reduced sections of the shaft on either side to give sufficient flexibility in the solid shaft to relieve the joint from undue transverse strain.

Figure 1 shows in plan the end of a shaft as made to unite a similar end on another shaft and form a shaft-coupling. Fig. 2 is a section on the line A B, Fig. 1. Fig. 3 is a section on the line C D, Fig. 1. Fig. 4 is a section on the line E F, Fig. 1, shown in proper relation to Fig. 3. Fig. 5 is an outside view of the shaft-coupling complete with reduced sections on either side. Fig. 6 is a section on the line G H, Fig. 5, of the two shafts united.

S is a shaft to be coupled to another similar shaft S', the parts of which are similar to those of S and designated by the same letters primed.

$a$ and $b$ are projecting ends or tongues on the end of the shaft S.

$c$ and $d$ are grooves in the shaft S, in which corresponding tongues of the shaft S' are intended to fit. These grooves have radial sides on the diagonals of the square shaft, and are separated by a web of metal at the bottom, as shown in Fig. 4. The radial sides of the grooves continued form the sides of the tongues, and the operation of grooving therefore makes a part of the tongues, which are completed by slotting the space.

For the sake of clearness it is well to make a sharp distinction between these grooves and tongues so closely related to each other. A shaft is understood to be grooved when its section appears in a closed space, as shown in Fig. 4, and it may be considered as tongued or notched when its section appears in two or more closed spaces, of which Fig. 2 is an example. The tongues $a b$ will therefore be understood to extend as far only as the slot $l$, while the grooves $c d$ extend only from $p$ to $r$. These tongues and grooves are of equal length, so as to fit together when two shafts are joined. One shaft may be tongued only and the other only grooved, or, if preferred, both may be tongued and grooved, as shown. In either case the joint is stronger than any that can be made by interlocking notches alone by reason of the web between the grooves, and the long joint, as shown, composed of grooves and tongues in each piece, has as great proportion of transverse strength in every direction as it has of torsional strength when compared with the solid shaft.

$g h$ and $i k$ are rivet-holes so placed that when two shafts are united the holes $g h$ in one will cover $i k$ in the other. The rivets through these holes bind the tongues on one shaft hard and fast into the grooves on the other, and any twisting or bending strain that may come upon the joint within proper working limits has no effect upon the rivets until their initial tension is exceeded. In the latter case the strain on the rivets would simply be one of increased tension, and no harm would result within the elastic limit of the material. It is preferable, of course, that the rivets should be strained to their working limit in the first place, so that the tongues shall be tight in their grooves under all conditions. This result is accomplished the more certainly by cutting the slot $l$ a trifle wider than the tongue $m$, allowing some clearance, as shown in Fig. 6.

It is manifestly impossible to make a mechanical union more than half as strong as the solid shaft, because at least half of one shaft or the other must be cut away, and therefore the shaft can be considerably reduced in size at $n$ and $n'$ and still be as strong as the joint; but although the strength at $n$ and $n'$ may be equal to that of the joint the stiffness at these points will be much less on account of their smaller diameter. It is therefore possible to relieve a stiff joint in a shaft from injurious transverse strain by reducing the section on either side of it. The amount of reduction and length of reduced section required depend, of course, upon the strength and stiffness of the joint, together with the amount of error in alignment or bend in the shaft. The present joint requires less provision of this kind than any other, because of its greater strength and stiffness. One or both of the reduced sections $n$ and $o$ may be used for a bearing, and in many cases it is probable that a reduced section on one side only will be sufficient, although two are preferred. It is evident that with rivets well set under a strong initial tension the joint thus made cannot open or slide on itself without stretching the rivets and exceeding its proper working strength, and that whether the strain be torsional or transverse it must be resisted in the rivets by tension alone rather than by any shearing action, as in other forms of joints.

The same form of joint as here shown and described for square shafts is applicable to round shafts, although the occasions for using it on the latter are less frequent. The appearance of such a joint in a round shaft can readily be imagined as the result of turning the square joint down to a round.

To take the joint apart it is simply necessary to chip off the heads of the rivets and drive them out.

The admission that mechanical joints can not be more than half as strong as a solid shaft is not a serious objection to their use when the advantages of large wearing corners and torsional stiffness in the shaft are considered. When these objects are attained, it will generally be found that no danger of weakness in a shaft-coupling of this kind need be apprehended.

Having now described my invention, what I claim as new, and desire to secure by Letters Patent, is—

1. Two shafts, each having equal and opposite grooves and tongues at their ends interlocked, in combination with a uniting bolt or rivet through the tongue of one shaft and the web between the grooves on the other, substantially as described.

2. A rigid shaft-coupling provided with tongues and grooves and a uniting bolt or rivet through the tongue of one shaft and the web between the grooves on the other, substantially as described, in combination with a coupled shaft having a reduced section on either side of the coupling, as and for the purpose set forth.

WILFRED LEWIS.

Witnesses:
JNO. H. SCHRACKE,
JOHN L. PHILLIPS.